Nov. 17, 1964     G. B. GREENE     3,157,029

JET ENGINE

Filed Feb. 28, 1961

INVENTOR.
GEORGE B. GREENE

BY

Lippincott, Ralls & Hendricson
ATTORNEYS

United States Patent Office 3,157,029
Patented Nov. 17, 1964

3,157,029
JET ENGINE
George B. Greene, 440 Buena Vista Drive, Pinole, Calif.
Filed Feb. 28, 1961, Ser. No. 92,314
13 Claims. (Cl. 60—39.77)

The present invention relates to an improvement and simplification in jet engines, and the like, and in particular, to the elimination of rotating machinery in engines of this type.

It is well known that conventional jet engines require high-pressure air, and there are commonly provided compressors such as turbo superchargers for this purpose. In addition to the material complexity that is introduced by this auxiliary machinery, a substantial proportion of the developed power is required to operate same. While the jet engine is basically quite simple, in actual practice this type of engine requires as many or more moving parts as a reciprocating engine. This complexity not only increases the cost and bulk of the engine, but furthermore, adds to the problems of maintenance and ultimately limits engine life.

While it is recognized that high gas pressures are required to initiate combustion of the extremely lean fuel mixtures employed in jet engines, it is provided hereby that such pressures need not be externally generated. Contrary to conventional practice, the present invention provides for charging of the combustion chamber with relatively low-pressure air, and for the attainment within the chamber of conditions supporting combustion of the charge. Aside from the improvement noted above and the provision of unique inlet and outlet means for the combustion chamber, the general theories of jet engines are applicable hereto. Thus, in the following disclosure of the invention no detailed explanation of jet engines in general is included, and reference to standard texts and publications may be had for such general information.

It is an object of the present invention to provide method and means to establish localized high-pressure ignition volumes within a combustion chamber for the combustion of very lean fuel mixtures.

Another object hereof is the provision of a simplified jet engine of enhanced overall efficiency.

A further object of this invention is to provide an improved jet engine operating without pressurized inlet air, and yet burning very lean fuel mixtures.

Yet another object of this invention is to provide an improved combustion chamber of prolate ellipsoid configuration for focusing energy at foci thereof to attain sufficient temperatures and pressures thereat for the ignition of fuel in a normally non-combustible mixture thereof with air.

Various other possible objects and advantages of the present invention will become apparent to those skilled in the art from the following description of the invention, herein referenced to particular preferred embodiments of the structure thereof. No limitation is intended by the terms of the following description, but instead, reference is made to the appended claims for a precise delineation of the true scope of this invention.

The invention hereof is illustrated as to particular preferred embodiments of the apparatus in the accompanying drawing, wherein.

The improved jet engine of the present invention, and the method and means hereof for internally generating conditions for ignition of extremely lean fuel-air mixtures, relies upon the focusing of energy at predetermined points in space. In this respect, attention is invited to my copending patent application Serial No. 65,221 for "Energy Focusing," and reference is made thereto for a detailed explanation of the focusing phenomena herein utilized to attain the desired temperatures and pressures for fuel ignition.

Figure 1:
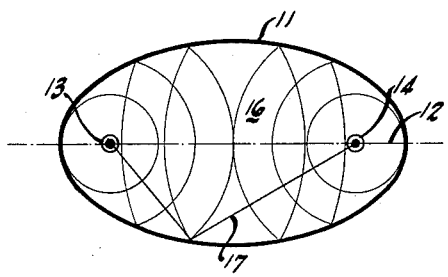
FIG. 1 is a diagram hereinafter employed in the explanation of energy focusing, as utilized in this invention.

Briefly considering the energy focusing hereof, and referring to FIG. 1, there will be seen to be illustrated an ellipse 11 with a major axis 12 extending through the foci 13 and 14 thereof. This illustration is intended to exemplify a prolate ellipse formed as a figure of revolution of the ellipse 11 about the major axis 12, so that in cross-section the volume or chamber 16 within the ellipse has the configuration of a prolate ellipse with a circular cross-section. Inasmuch as an ellipse comprises the locus of points which have the sum of the distances to each of the foci 13 and 14 equal to the length of the major axis 16, it will be appreciated that a ray, or the like 17, emanating from one focal point 13 will be reflected from the elliptical wall 11 back to the other focal point 14. It is further noted in this respect that the tangent to the ellipse at any point thereon is normal to the bisector of the angle between an incident and reflected focal ray at such point, and consequently, a ray emanating from either of the foci will be reflected back through the other focal points. Further to the focusing properties of a prolate ellipsoid, instantaneously applied pressure at or about one of the focal points will travel as a sonic wave spherically outwardly thereof into impingement upon the surrounding ellipsoidal wall, and thence by reflection back into focus at the other focal point. This is illustrated in FIG. 1 by the succession of light curved lines therein. Thus, a spark or some other type of relatively instantaneous pressure excursion at the focal point 13 will be seen to radiate spherically outwardly, as indicated by the successively larger circles about this point. The larger circle about the focal point 13 illustrates the sphere of the radiated shock wave or sonic wave at the point of initial wave contact with the ellipsoidal container, and following this in time there is shown successive portions of the direct and reflected wave as it passes to the right in the ellipsoid, until same is entirely reflected, as indicated by the largest circle about the focal point 14. From this time on, the wave will be seen to be directed inwardly toward the focal point 14 so as to focus thereat, and thereby produce an implosion which is, in effect, a reproduction of the explosive force originally liberated in a zone centering upon the focal point 13. Following the passage of the shock wave through the focal point 14, same will then again expand in the same manner as an explosion, which will, however, have a much greater intensity than the original explosion because of the point source or reduced volume of origination thereof. The wave will move spherically outward from the focal point 14 and back to the left of the ellipsoid into refocus at the initial focal point 13. By timing successive pressure excursions at one or both foci of the ellipsoid, it is possible to successively fortify or enhance the sonic wave passed back-and-forth through the ellipsoid, and thus to maximize successive pressure crests or maxima at the foci.

It will be seen from the above brief description and the more detailed description set forth in my above-referenced copending patent application, that energy released at one or both foci of an ellipsoid will be refocused successively at the foci, and furthermore, that maximum energy concentration occurs only at the foci of the ellipse.

Although wall losses in the reflection of the shock wave discussed above will initially be quite small, it is to be appreciated that after some period of time the wall losses will increase to such a point that an equilibrium is attained within the chamber 16, so that the amount of energy added by successive energy releases will then equal the amount of energy lost in reflection from the walls. Various parameters are important in minimizing wall stresses, and the like; however, in this respect attention is again invited to my above-referenced copending patent application.

Figure 3:
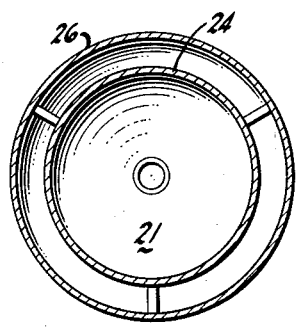
FIG. 3 is a transverse sectional view taken in the plane 3—3 of FIG. 2.
Figure 2:
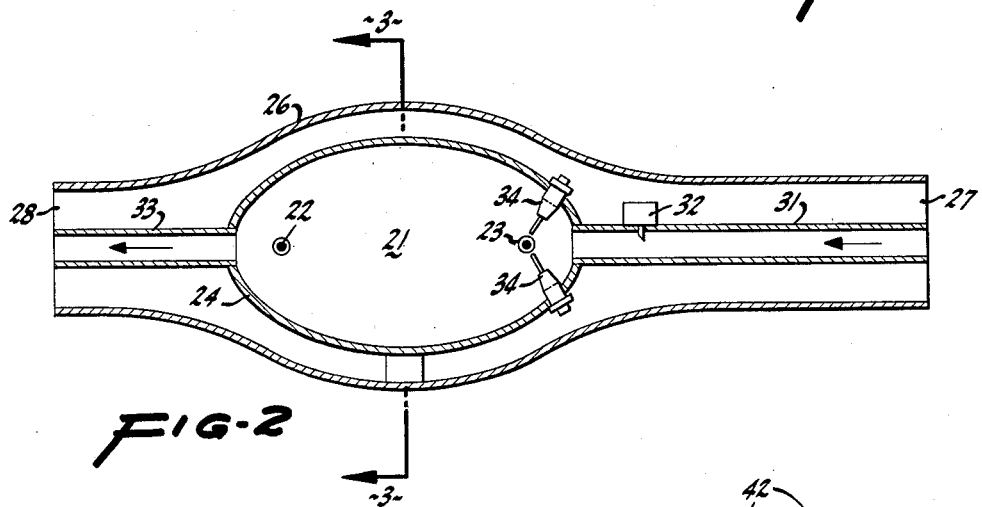
FIG. 2 is a longitudinal, sectional view of a jet engine, in accordance with this invention.

Considering now the improved jet engine of the present invention, and the novel method and means of internally generating ignition conditions for combustion of very lean fuel mixtures in a combustion chamber, reference is made to FIGS. 2 and 3, wherein there will be seen to be illustrated a combustion chamber 21. This chamber has the configuration of a prolate ellipsoid with foci 22 and 23 therein, and is defined by a containment vessel or shell 24, which may have somewhat of a cigar shape both inside and outside thereof. In common with more conventional jet engines, the engine hereof is further provided with an outer shroud 26 having a front opening 27 and disposed coaxially with the containment vessel 24, so as to bulge outwardly from the front thereof to a maximum central diameter, and thence tapering inwardly toward the rear at which there is disposed an exit opening 28 of greater diameter than the inlet opening. Suitable means, not shown, may be provided for structurally supporting the combustion chamber shell 24 within the outer shroud 26, and likewise, suitable mounting means for the overall engine will be affixed thereto, in accordance with accepted practices.

Considering now the combustion of fuel in the chamber 21, it is herein contemplated that a flow of air and intermixed volatile fuel shall enter the combustion chamber wherein the fuel is burned in an overabundance of air, to thereby expand and be expelled from the chamber to form the thrust of the motor hereof. An inlet pipe 31 is disposed at one eccentric end of the shell 24 along the major axis thereof, and thus, in line with the inlet opening 27 of the surrounding shroud 26. Fuel supply means 32 are connected to this inlet pipe 31 exteriorly of the combustion chamber for metering fluid fuel into the air passing through the inlet pipe 31 into the chamber. At the opposite end of the shell 24, there are provided one or more outlet pipes 33, herein illustrated as also being disposed upon an extension of the major axis of the ellipsoid and directed toward the outlet 28 of the surrounding shroud. A plurality of outlet pipes is advantageous over one large pipe not only in relation to the acoustical impedance factor, but also in more precisely defining the pipe length. Within the combustion shell 24 there are provided electrodes 34 which are disposed with a short gap therebetween across one of the focal points 23 of the ellipsoid. Charging means, not shown, are provided for producing a spark discharge between the electrodes 34 to thereby explosively release energy at the focal point 23 of the combustion chamber, and in this respect, any one of a variety of charging circuits is suitable for this use. It is not herein necessary, however, for the electrodes 34 to be continuously or successively energized, for only combustion initiation is required, and from that point on the conditions for combustion are successively reproduced at the foci of the ellipsoidal chamber. Thus the electrodes 34 are initially successively energized in synchronism with the refocusing of shock waves at the focal point 23 to achieve fuel ignition conditions thereat and may then be deenergized.

Various alternatives are possible in achieving ignition or reignition conditions within the chamber 21. For example, a small explosive charge may be originally detonated at or about a focal point to release sufficient energy for initiating combustion. This charge could comprise a small paper-packaged black power charge or other explosive material, centered on a focal point and detonated electrically or otherwise to release sufficient energy in a single burst for starting combustion. Such an arrangement obviates the necessity of providing high voltage equipment in conjunction with the engine, and this is highly advantageous in airborne restarts.

With regard to the process of combustion within the chamber 21, there is provided therein a very lean mixture of air and vaporized fuel. This mixture is maintained so lean that it would not normally be considered combustible; however, combustion of same is herein achieved by attaining very high localized pressures and temperatures. As noted above, there is focused at the foci, pressure waves traveling at the speed of sound in the medium within the chamber to concentrate at the foci and achieve ignition and combustion conditions in the vicinity of the foci. The shock waves or sonic waves are successively focused to produce two zones of combustion about the two foci 13 and 14. This may be further explained by pressure considerations wherein P is the instantaneous pressure at a distance $r$ from a focus, $Po$ is the initial focal pressure, and $Pa$ is the ambient pressure. These quantities may be related by the general expression:

$$P = Pa + \frac{Po}{r^2} f(p,t)$$

where $f(p, t)$ is some function of pressure and temperature and is herein initially assumed to follow a sinusoidal variation. The relationship may then be rewritten as:

$$P = Pa + \frac{Po}{r^2} \sin \omega$$

At some considerable distance from a focal point a shock wave crest traveling at the velocity of sound may be observed to pass through a stable or non-flaming zone wherein the heat produced by oxidation of a charge from the pressure and temperature thereat is less than the heat losses. A reduction of $r$ as the crest moves toward a focal point increases the peak amplitude of the sine wave by the square of the radius reduction until a critical $r$ is reached, whereat the rate of oxidation is sufficient to produce heat faster than it is lost and flaming of the charge results. This produces a spherical flame front of critical radius $r$ and this front propagates outwardly and inwardly of the sphere. The inwardly moving flame propagates at the velocity of sound as the rising pressure crest moves at this velocity to progressively ignite the charge. Outward propagation of the flame front is much slower as its velocity is only about the flame propagation velocity in the charge. This outward flame propagation will continue only until the low pressure crest of the sonic wave intersects the flame to reduce the pressure (and temperature) below instability conditions, so that the flame is extinguished. The inwardly progressing flame front experiences self extinction at the focus for lack of combustible material.

The initial assumption above regarding a sine wave function of pressure and temperature will be seen to be somewhat less than exact, particularly in the vicinity of the focus, however, it does provide some information on the behavior. A very steep wavefront is built up on the front of the converging pressure crest so that the forward-going pulse is of quite short duration, while the relatively negative portion of low amplitude has a longer duration. This is advantageous in that the low pressure portion of the wave provides for extinguishment of the flame, and thus a relatively wide non-flaming zone is assured between the foci. Separation of the flaming zones is important to prevent premature burning, and thus scavenging of a focal area prior to pressure wave focusing thereat, for such would interrupt the desired successive firings herein.

The shock waves focused back-and-forth between foci of the chamber are reinforced by each combustion about a focal point, so that there is achieved autoignition at spaced zones in the chamber. Combustion is extinguished between these zones so that successive firings at alternate foci occur following initial ignition.

It will be appreciated that large amounts of heat energy are released by the flame of combustion at the two foci, and it will initially appear that there will be an equal tendency for gases to expand in both the forward and backward direction. Useful output from the engine is attained by the utilization of tuned lines connecting same with the exterior thereof. The input line 31 is formed as a half-wavelength tuned pipe, i.e., the length of the pipe 31 is equal to the length of the major axis of the ellipsoid, or multiple thereof. This half-wave inlet pipe 31 will thus be seen, in analogy to transmission lines in high-frequency electrical fields, to provide a maximum impedance to the flow of energy therethrough. Standing waves established in this half-wave line will thus be seen to discriminate against the transmission of energy outwardly from the chamber through the line. In the alternative, the outlet pipe 33 is formed as a quarter-wave tuned line, thus having a length equal to one-half the length of the major axis of the ellipsoid, or an odd multiple thereof. Again in analogy to high-frequency transmission theory, it will be seen that this quarter-wave tuned line produces a minimum of reflection of sound energy at the cavity wall, so that the end result is for the gases expanding within the cavity to preferentially leave same through the exhaust or outlet line 33. In further explanation of the foregoing, it may be noted that there is produced a resonant interchange of energy between the foci 22 and 23 of the ellipsoidal cavity, owing to the reflection of a sonic wave from the walls of such cavity back into focus at the focal points thereof. By forming the inlet pipe 31 as a half-wave tuned line, and by forming the outlet pipe 33 as a quarter-wave tuned line, there will be established standing waves within these lines, such that an effective high pressure exists at the inner end of the inlet line 31, and an effective low pressure exists at the inner end of the outlet line 33. Within the combustion chamber 21, there is produced a periodic firing of the volatile fuel in the overabundance of air therein, and the shock waves originating in the chamber may be likened to waves of electrical energy, as regards the establishment of particular standing waves in tuned lines.

As regards the flow of gases through the chamber, steady-state operating conditions produced a continual and relatively even flow of air in through the inlet pipe 31. From the outlet pipe 33 there is discharged a greater volume of gas than that entering the engine, so as to thereby produce a jet propulsion force from the combustion of fuel within the chamber 21. The expansion of gases within the chamber will operate as a ram jet with the difference, however, that this device is selfstarting. Appropriate relative sizes of pipes and combustion chamber are employed to guarantee the presence of successive explosions at the foci of the combustion chamber, and in this respect a substantial eccentricity of the chamber is preferable. Thus, it is not only necessary for the inlet gas to ignite at a focal point of the combustion chamber, but furthermore, it is necessary for combustion to extinguish at some distance from the focal point less than the separation of focal points. Operation of the engine depends upon successive firing at the foci of the combustion chamber; however, there is herein provided an inherent insurance against flame-out. The reflection of shock energy within the chamber between the foci thereof continues well beyond the period of some relatively large number of separate ignitions, so that in the event ignition does not occur at one foci, the shock energy continues to be refocused at successive focal points until ignition does occur. Failure of ignition can arise from overextension of the flame front from one focal point, so that insufficient fuel is available at the other focal point for ignition at the time energy is focused thereat. In this latter instance, the shock energy continues to be refocused at successive foci until an adequate charge is available for ignition at the temperatures and pressures established at these foci. As long as a flow of air and volatile fuel enters the combustion chamber through the inlet pipe 31, the jet engine hereof will continue to develop power and thrust, contrary to more conventional jet engines which suffer from the severe difficulty of flame-out which then wholly incapacitates the engine. Reignition under severe conditions may be further aided by manually or automatically spraying a highly flammable mixture, such as carbon disulphide and nitrous oxide, into a focal zone, as such is readily ignited.

With regard to the starting of the engine hereof, it will be appreciated that an initial flow of air and volatile fuel into the combustion chamber is required. This may be readily accomplished through auxiliary means not necessarily directly associated with the engine itself. Thus, for example, a small blower, or the like, may be utilized to initiate the flow of air, and during starting conditions an overabundance of fuel may be added to the air in order to facilitate immediate ignition within the chamber. This provides the advantage that a lesser amount of energy need be initially released between the electrodes 34 to accomplish combustion within the chamber. Once combustion is initiated, the original spark energy is augmented and successively fortified at the separate foci by combustion energy released thereat, so that the temperatures and pressures at these foci materially increase, and consequently, the successive ignition of volatile fuel in a large overabundance of air provides no further problem.

Figure 4:
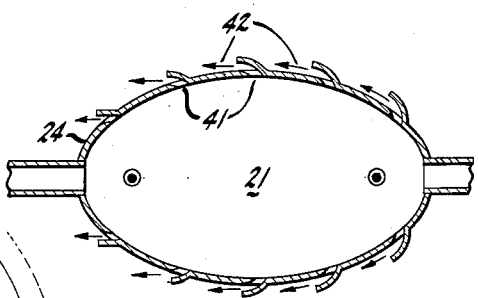
FIG. 4 is a schematic illustration of an alternative combustion chamber configuration, in accordance herewith.

Various modifications and alternatives to the above-described preferred embodiment of the present invention are possible, and in this respect, attention is invited to FIG. 4 of the drawing wherein there is illustrated in the combustion shell 24 as having a plurality of louvered vents 41 formed therein. The arrows 42 in FIG. 4 are illustrative of the direction of gas flow through the vents from the interior of the combustion chamber into the annular space thereabout within the shroud 26. Various advantages are possible with this configuration. Thus, for example, the combustion gases escaping through the vents 41 will induce the flow of air through the annular tunnel within the shroud 26, so that together with the heating effect from the combustion gases emerging from the outlet pipe 33 there will be produced an effective jet thrust for the engine. The vented chamber may also be considered as a loaded resonant cavity, which serves the further purpose of limiting the extent of the flame from individual firings, so as not to deplete the fuel at the opposite firing point unduly. Also, the loading of the resonant cavity forming the combustion chamber hereof will be seen to modify the ultrasonic energy distribution so as to form a knee in the curve thereof. Alternative steps may also be taken to accomplish one or more of the above-noted advantageous variations in the engine.

Figure 5:
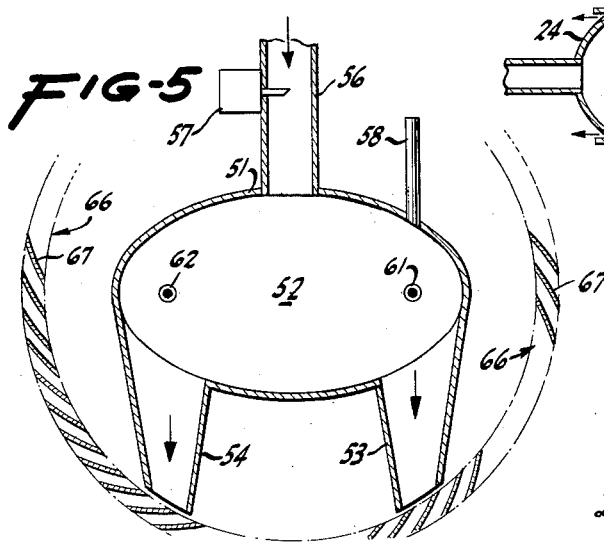
FIG. 5 is a schematic illustration of yet another embodiment of this invention.

A further modification of the present invention is illustrated in FIG. 5 of the drawings, wherein there is shown an adaption of the invention to a jet turbine application. The embodiment illustrated in FIG. 5 includes a pressure vessel 51 defining a chamber having the configuration of a prolate ellipsoid of a substantial eccentricity. Quarter-wave exhaust stacks 53 and 54 extend from one side of the vessel and a half-wave inlet pipe 56 extends from the opposite side of the vessel. A fuel injector 57 is provided in the inlet pipe 56 in order to meter a volatile fuel into a moving stream of air entering the vessel through this inlet pipe. This embodiment of the invention provides for the positioning of the exhaust stacks 53 and 54 in line with the two foci 61 and 62 of the chamber 52 for direct exhausting of the combustion products from each of the separate firing zones within the chamber.

Combustion may be initiated within the chamber by the production of an arc, or the like, between electrodes disposed within the chamber, as described above, or some other type of explosive initiator may be employed. Thus, as previously suggested, an explosive charge may be initially introduced into the chamber and detonated at a focal point thereof to establish sonic waves which are successively focused at the foci of the chamber to attain sufficiently high temperatures and pressure for initial ignition of the fuel. There is illustrated in FIG. 5 a tube 58 extending through a wall of the vessel in line with a focal point 61, for the purpose of introducing an initiator into the chamber. This method of initiating ignition is advantageous in instances wherein high voltage power supplies may not be readily available for energizing electrodes such as, for example, in flight conditions following an inadvertent flame-out.

The physical disposition of the inlet and outlet means of the embodiment of the invention illustrated in FIG 5 has certain advantages over the in-line arrangement of FIG. 2. Thus, in the instance of supersonic velocities of travel of the jet engine, the inlet air to the chamber may well have a velocity in excess of the velocity of sound. It will be appreciated that under such conditions difficulty may be expected in propagating pressure waves at the velocity of sound between the foci. With respect to this possible difficulty, it is noted that the ratio of chamber cross-section to inlet pipe cross-section is sufficiently high that subsonic air velocities are normally maintained within the chamber for quite high supersonic inlet air velocities. The configuration of FIG. 5, wherein there is employed two exhaust stacks does, however, produce an added turbulence to insure subsonic air velocities within the chamber, particularly with regard to circumstances wherein inlet air velocities may exceed Mach 5. Added air turbulence within the chamber may be accomplished by insertion of the inlet pipe into the chamber, so that the inlet end of the pipe actually extends toward and possibly even to the center of the chamber.

Operation of the embodiment of the invention illustrated in FIG. 5 and described immediately above, is substantially the same as that described for the embodiment of FIG. 2. In brief, a charge of air and volatile fuel enters the ellipsoidal chamber 52, and following the establishment of sufficient pressure and temperature conditions at a foci thereof, ignition occurs whereby the charge is burned in the vicinity of such focal point. There is produced a pulsating operation wherein the charge is burned about and at one of the focal points, while the area about the other focal point is being scavenged. It is of particular importance that a pulsating operation does occur, and that the combustion about one focal point does not extend to the other focal point, for in such instance there would result a premature depletion of the charge at this latter point, so that desired ignition of the charge on the next half-cycle of operation would not occur.

In steady-state operating condition, there is, as discussed above, produced a focusing of acoustic energy at the focal points of the chamber. At some critical radius outwardly from a focal point, there is achieved a sufficient pressure to ignite the charge in that portion of the chamber, and the charge progressively burns inwardly toward the focal point with the flame front progressing at the velocity of sound, rather than at the normal velocity of flame propagation. There consequently results a percussion about the focal point, with the energy of combustion concentrated at the focal point. Some burning of the fuel outwardly from this critical radius does occur; however, combustion travels outwardly from the critical radius at the normal flame propagation rate, so as to rapidly extinguish because of the lack of sufficient pressure to maintain combustion. It is particularly noted in this respect that the charge of volatile fuel and air within the combustion chamber is extremely lean, so as to be normally non-combustible and to attain combustion only with a material increase in pressure over atmospheric. It is further noted that the output from the jet engine hereof is controlled solely by the amount of fuel metered into the inlet air. It is not necessary to provide valving in the inlet line, such as is normally required in conventional carburetion systems. There may, in fact, be employed fuel injection means to meter the fuel into the air entering the chamber.

As an added feature of the present invention, and to the end of further increasing efficiency thereof, there may be employed a pulsating fuel injection. As noted above, the jet engine hereof operates in a pulsating manner, wherein successive explosions or burnings of the fuel occur about the two foci of the chamber, and it is possible to inject the fuel into the inlet line in appropriate phase relation and synchronization with this pulsating operation, so as to insure the burning of a greater percentage of the inlet fuel. It is also possible with the present invention to employ water injection, as is conventional in jet engine operation, and in this respect also a pulsating injection may be utilized if desired. With a pulsating fuel feed, it will be appreciated that the scavenging of the area about one focal point during combustion at the other focal point, will be accomplished by pure air, with substantially no loss of inlet fuel.

Any of the embodiments of the present invention may be employed in connection with jet turbine propulsion or power generation. This is schematically illustrated in FIG. 5, wherein there are shown portions of a turbine wheel 66 having blades 67 thereon adapted to intercept exhaust products of the engine hereof. With the turbine wheel mounted for rotation, it will be appreciated that the combustion products exhausted from the stacks 53 and 54 will strike the turbine wheel 67 to rotate the wheel.

In connection with the present invention, and all embodiments thereof, it is particularly noted that the jet engine hereof provides for substantially instantaneous thrust without a time lag between a desire for power and a realization of same. The total absence of rotating machinery in the present invention will be seen to remove the inertia limitations formerly associated with jet engines. This is particularly advantageous in a wide variety of situations. It is specifically noted in this respect, that in the propulsion of airplanes, for example, conventional jet engines cannot be controlled with sufficient rapidity to produce large amounts of thrust in short response periods, so that upon landing of an airplane, or the like a decision as to landing must be finally made sometime prior to the actual operation. More specifically, it is noted that with conventional jet engines a reduction in the power output of the engine is unavoidably followed by a substantial period of low power output, so that the receipt of later or different information by an operator, for example, is of little avail should such dictate the immediate reapplication of power to the plane. With the jet engine of the present invention, it is possible to substantially immediately reproduce full or materially increased power output, so that as a practical result a jet engine airplane equipped with the present invention may recover from landing operations initiated under circumstances not possible with conventional jet engines. This, then, provides a substantial increase in the margin of safety and control available in the power flight of airplanes.

The present invention has been set forth above in connection with particular preferred embodiments thereof, however, various other modifications are possible, and in fact advantageous, for particular applications. For example, there may be employed one or more auxiliary ellipsoidal chambers in connection with a main chamber, as herein illustrated, to the end of focusing pressure waves into the main chamber for initial ignition of the charge. Additionally, the invention hereof is particularly adapted to ram jet operation for manned flight, as the difficulties of flame out in conventional ram jet propulsion equipment are entirely overcome hereby. As regards aircraft propulsion, the invention hereof may be employed as an initial stage for a ram jet engine, and also may be employed in series-combination with fuel addition between stages. Higher combustion efficiencies are possible with the engine of this invention, and it is possible to effect a substantial reduction of transmitted engine vibration and noise level during operation by the utilization of tuned isolation mounting of the shell.

The internal generation and refocusing of shock energies within the combustion chamber of this invention serves not only to materially reduce the complexity and cost of the engine hereof, but furthermore, reduces the weight and provides highly advantageous protection against flame out so as to afford a substantial advancement in the art.

What is claimed is:

1. An improved engine comprising a shell defining a combustion chamber of prolate ellipsoid configuration, a carburetor feeding a lean mixture of volatile fuel and air into said chamber at a pressure below combustion conditions for said mixture, means initiating a single explosive energy release within the chamber at one of the foci thereof, whereby fuel is ignited to burn in the chamber at the foci thereof and energy is successively refocused at said foci to establish combustion conditions thereat for burning of said fuel and air mixture, and outlet means extending from the chamber to accommodate the passage of hot combustion gases therethrough from the chamber.

2. An improved jet engine comprising a shell defining a chamber of prolate ellipsoid configuration with foci separated along the major axis thereof, an open-ended shroud about said shell concentric therewith and defining an annular passage thereabout, an inlet pipe communicating with said chamber on a forward extension of the major axis thereof for admitting air and volatile fuel into the chamber, means metering volatile fuel into said inlet pipe for mixture with air to form a lean charge in said chamber, said charge being sufficiently lean to be substantially incombustible at chamber pressure electrodes adjacent at least one foci of said elliptical chamber adapted for energization to spark therebetween for igniting said charge thereat, whereby the shock energy at said foci is successively refocused at said foci for repeatedly igniting fuel thereat, and at least one outlet pipe extending from said chamber toward an open shroud end in alinement with the major axis of said elliptical chamber for discharging products of combustion from said chamber.

3. A jet engine as set forth in claim 2, further defined by said inlet pipe having a length substantially equal to the length of the major axis of said elliptical chamber, and each of said outlet pipes having a length substantially equal to one-half the length of the major axis of said elliptical chamber.

4. A jet engine as set forth in claim 3, further defined by said shell having a plurality of perforations therein directed rearwardly in part toward the exhaust end of said shroud about said outlet pipe for the escape of some combustion gas from the chamber into the volume about said shell and within said shroud to urge the flow of air therethrough.

5. A jet engine comprising an elongated shell defining a combustion chamber having a prolate ellipsoid configuration of substantial eccentricity; carburetion means for admitting air and volatile fuel into said chamber and including at least one inlet pipe through said shell at the front end thereof on the major axis of the ellipsoidal chamber, said pipe having a length substantially equal to a multiple of the length of the major axis of said ellipsoidal chamber, and means feeding volatile fuel into said pipe for mixture with inlet air passing therethrough in a lean mixture to charge said chamber; at least one outlet pipe extending from said chamber at the opposite end thereof from said carburetor means in alinement with the major axis of said chamber and having a length substantially equal to an odd multiple of one-half the length of said major axis of the ellipsoidal chamber; a shroud about said shell with annular openings about said inlet and outlet pipes and defining an annular passage about said shell for the passage of air thereabout, and means explosively releasing energy at at least one focal point of said ellipsoidal chamber for igniting fuel thereat whereby energy is refocused at both foci for successive ignition of fuel at the foci of the chamber.

6. An improved engine comprising a vessel defining a chamber of prolate ellipsoid configuration with a substantial eccentricity, exhaust pipes extending from said chamber in alinement with separate foci thereof for directing combustion products from the chamber, inlet means feeding a very lean mixture of air and volatile fuel into said chamber and including a pipe extending into said chamber out of line with said exhaust pipes, and means establishing pressure waves about a focal point of the chamber of sufficient magnitude to initially ignite said fuel for combustion about the focal points whereby pressure waves are successively focused at the chamber foci to cyclically ignite fuel thereat for alternate combustion about said foci and extinguishment between the foci.

7. An engine comprising means defining a combustion chamber of prolate ellipsoidal configuration with foci substantially separated along a major axis, means initiating an explosive energy release at a focal point of the chamber whereby shock energy is resonantly reflected into successive focus at the chamber foci at a fixed frequency, means continuously charging said chamber with air and volatilized fuel at an ambient chamber pressure below that required for combustion of said mixture for successive ignition and limited burning of the mixtures only adjacent said separate foci whereat said focused shock waves establish combustion conditions for said mixture, whereby energy of combustion is also successively focused at said foci, and means defining an outlet from said chamber for the exit of hot gases of combustion as a thrust from the engine.

8. A jet engine as set forth in claim 7, further defined by said outlet from said chamber comprising a plurality of pipes extending from said chamber with lengths substantially equal to one-quarter wavelength of resonant energy interchange in said chamber for presenting a minimum resistance to the flow of gas from the chamber during starting of the engine.

9. An improved gas turbine comprising a turbine wheel having blades thereon, a pressure vessel defining an elongated chamber with at least one exhaust pipe extending therefrom into proximity with said turbine blades, said chamber having the configuration of a prolate ellipsoid of substantial eccentricity, means directing a flow of air and intermixed fuel into said chamber with said mixture having a very small proportion of fuel therein to maintain the mixture non-combustible in the absence of extreme temperatures or pressures, and means establishing a shock wave at a foci of said chamber for propagation at sonic velocity into successive alternate focus at said foci to achieve ignition conditions for said mixture thereat, whereby said fuel burns in an overabundance of air in limited zones about said foci and pressure waves are focused into successive focus at said foci for autoignition of fuel in zones about said foci.

10. A gas turbine as set forth in claim 9 further defined by said chamber having two exhaust pipes extending from one side of the chamber in alinement with separate chamber foci, and said means directing a flow of air and fuel into this chamber comprising an inlet pipe piercing the vessel on the opposite side thereof from said exhaust pipes and disposed between the exhaust pipes for even distribution of air and fuel throughout the chamber.

11. An improved jet engine comprising a pressure vessel defining a combustion chamber of prolate ellipsoid configuration with spaced foci, means initiating at least one explosive energy release at one of said foci for successive focusing of shock energy at said foci, inlet means directing a flow of air and fuel into said chamber in a very lean mixture that is substantially incombustible, whereby said explosive energy release produces pressure conditions sufficient for fuel combustion at successive foci, and exhaust means extending through said vessel in line with at least one chamber foci for the exit of combustion gases.

12. A jet engine as set forth in claim 11 further defined by said inlet means comprising a pipe into the chamber and means metering fuel into said pipe through which air flows for controlling engine output by fuel metering alone without throttling air flow.

13. A jet engine as set forth in claim 11 further defined by said inlet means comprising a pipe communicating with said chamber and pulsating fuel injection means metering fuel into said pipe with pulsations synchronized with the firing frequency within said chamber.

References Cited in the file of this patent

UNITED STATES PATENTS

| | | |
|---|---|---|
| 2,519,616 | Watkins | Aug. 22, 1950 |
| 2,543,053 | Parker | Feb. 27, 1951 |
| 2,555,085 | Goddard | May 29, 1951 |
| 2,605,608 | Barclay | Aug. 5, 1952 |
| 2,731,795 | Bodine | Jan. 24, 1956 |
| 2,796,735 | Bodine | June 25, 1957 |
| 3,005,310 | Reder | Oct. 24, 1961 |

OTHER REFERENCES

"Sonics" (Hueter et al.), published by Wiley, 1955, pages 34–38 relied on.